United States Patent [19]

Prince et al.

[11] 4,352,518

[45] Oct. 5, 1982

[54] VISOR

[75] Inventors: Edgar D. Prince; Konrad H. Marcus, both of Holland, Mich.

[73] Assignee: Prince Corporation, Holland, Mich.

[21] Appl. No.: 17,417

[22] Filed: Mar. 5, 1979

[51] Int. Cl.³ ............................................. B60J 3/02
[52] U.S. Cl. ................................ 296/97 H; 296/97 K
[58] Field of Search ................ 296/97 H, 97 K, 97 C; 280/154.5 R; 285/381, 423; 403/273

[56] References Cited

U.S. PATENT DOCUMENTS

| | | | |
|---|---|---|---|
| 2,628,125 | 2/1953 | Jacobs | 296/97 K |
| 3,423,518 | 1/1969 | Weagant | 285/381 X |
| 3,910,627 | 10/1975 | Meyer | 296/97 K X |
| 3,999,871 | 12/1976 | Palmer et al. | 296/97 K X |
| 4,075,468 | 2/1978 | Marcus | 296/97 H X |
| 4,148,519 | 4/1979 | Hollar, Jr. | 296/97 H |

FOREIGN PATENT DOCUMENTS

| | | | |
|---|---|---|---|
| 467710 | 8/1950 | Canada | 296/97 K |
| 470897 | 1/1951 | Canada | 296/97 K |
| 2236921 | 1/1974 | Fed. Rep. of Germany | 296/97 K |
| 503211 | 3/1971 | Switzerland | 403/273 |

Primary Examiner—David M. Mitchell
Attorney, Agent, or Firm—Price, Heneveld, Huizenga & Cooper

[57] ABSTRACT

A vehicle visor includes a molded body pivotally secured to a vehicle by means of a pivot mounting bracket and a support rod. The support rod is L-shaped with a torque fitting at an end secured within the pivot bracket for movement about an axis permitting the visor to swing from the front of the vehicle to the side. The visor body is secured to an elongated section of the L-shaped rod by a pair of torque fittings permitting rotation of the visor body on the support rod. The torque fittings comprise a lubricous polymeric material molded onto the support rod to provide a predetermined torque between the fittings and the rod. The fittings are anchored within the body of the visor and the pivot bracket permitting movement of the visor along the two axes. In the preferred embodiment, the torque fittings include oppositely extending configurated flanges fitted into keyways within the visor body and pivot bracket for anchoring the rod within the visor body.

31 Claims, 11 Drawing Figures

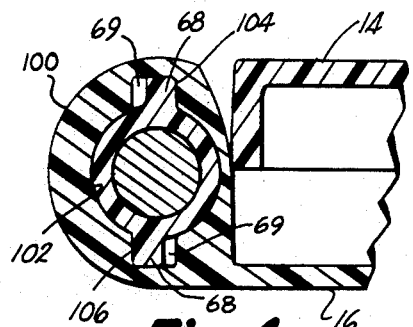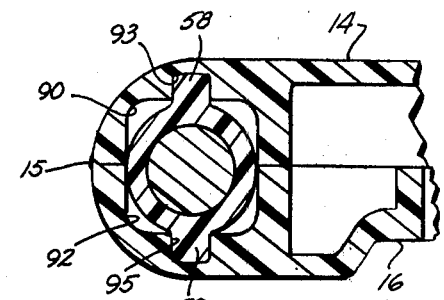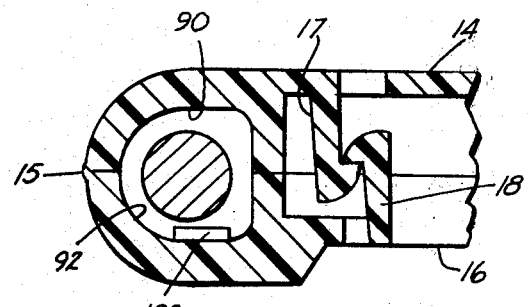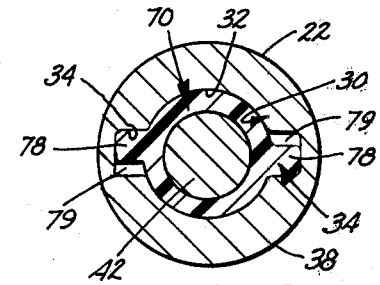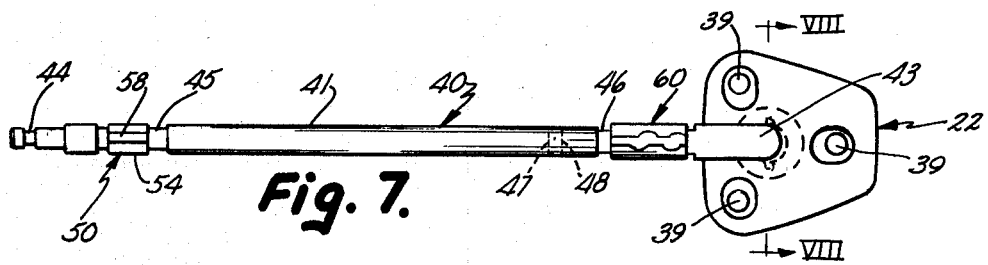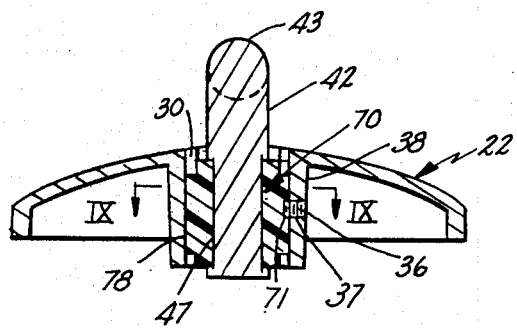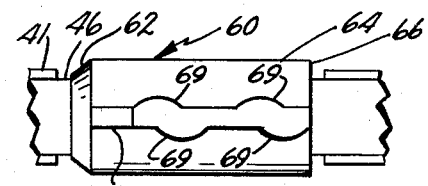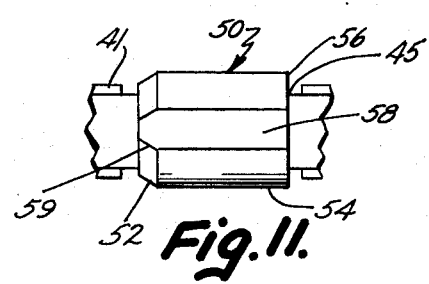

VISOR

BACKGROUND OF THE INVENTION

The present invention relates to vehicle sun visors and particularly to improved means for mounting visors for movement along one or more axes.

Visors used in vehicles are pivoted on a support rod for movement between an upward storage position and a downward position for blocking sunlight from the driver's eyes. Also, the visors typically can be pivotally moved from side to side to cover either the windshield or one of the side windows for blocking sunlight from different directions. In order to hold the visor in the stored position or in a position to which the operator has adjusted the visor, the visors typically include a torque fitting to hold the visor in an adjusted position. Such torque fittings in the prior art have usually involved adjustable compression fittings such as generally U-shaped bands surrounding and adjustably clamped to the support rod to which the visor body is mounted. Visors manufactured by the assignee of this application have employed a straight visor support rod with such an adjustable compression fitting to provide for vertical movement of the visor. The straight rod in turn is secured to an elbow and pivot bracket which has its own torque fitting including a compression spring mounted to provide a stiffly rotating coupling between the elbow and pivot bracket. The pivot bracket in turn is secured to the vehicle headliner.

It has been discovered that lubricous plastic material molded in a collar around the end of a rod will, when cooled to room temperature, shrink to compressively grip the rod and provide a breaking torque between the rod and collar which is sufficient for holding a visor in place. This principle has been tried on a cantilever mounting at the end of a visor support rod to a pivoted socket by providing such a collar at one end of the rod and inserting the collar into a socket external to the visor body. Such an arrangement provides only minimum contact at the end of the support rod which causes significant pressure on the plastic material. This in turn can cause the material to cold flow and wear out at pressure points. Also, the cantilever mounting does not provide a very rigid coupling of the visor to the pivot bracket with the plastic collar interface at such junction.

SUMMARY OF THE INVENTION

The visor system of the present invention encompasses the utilization of a support rod extending within a leading edge of a visor body and including torque fittings lockably fitted within the visor body permitting rotation between the support rod and the torque fitting. The torque fittings comprise a lubricous polymeric collar molded onto the rod and of a material which shrinks upon cooling to compressively grip the rod with a breakaway torque for the visor of from about ½-6 foot pounds.

In one embodiment of the invention, the support rod includes a right angle bend at the end extending from the visor and a similar torque fitting is lockably fitted within a mounting bracket permitting pivoting of the visor at the mounting bracket in a generally horizontal plane. According to another feature of the present invention, a pair of spaced torque fittings are employed each of which include flange means extending to secure the torque fittings to mating keyways formed in the visor body.

Such structure provides simplified construction for visor assemblies and greatly reduces the cost while increasing the durability and reliability of the visors. By changing the length of the torque fitting, the desired torque can be selected for a given application.

These and other objects, features, and advantages of the present invention can best be understood by reference to the following description thereof, together with the drawings in which:

BRIEF DESCRIPTION OF THE DRAWINGS

FIG. 4 is an enlarged fragmentary cross-sectional view taken along section lines IV—IV of FIG. 3 but shown with the visor body halves in a closed position;

FIG. 5 is an enlarged fragmentary cross-sectional view taken along section lines V—V of FIG. 3 but shown with the visor body halves in a closed position;

FIG. 6 is an enlarged fragmentary cross-sectional view taken along section lines VI—VI of FIG. 3 but shown with the visor body halves in a closed position;

FIG. 7 is a plan view of the visor support rod shown in FIG. 3;

FIG. 8 is an enlarged cross-sectional view taken along section lines VIII—VIII of FIG. 7;

FIG. 9 is an enlarged cross-sectional view taken along section lines IX—IX of FIG. 8;

FIG. 10 is an enlarged fragmentary plan view of the torque fitting near the right end of the torque fitting shown in FIG. 7; and FIG. 11 is an enlarged fragmentary plan view of the torque fitting near the left end of the support rod shown in FIG. 7.

DETAILED DESCRIPTION OF THE PREFERRED EMBODIMENT

Figure 1:
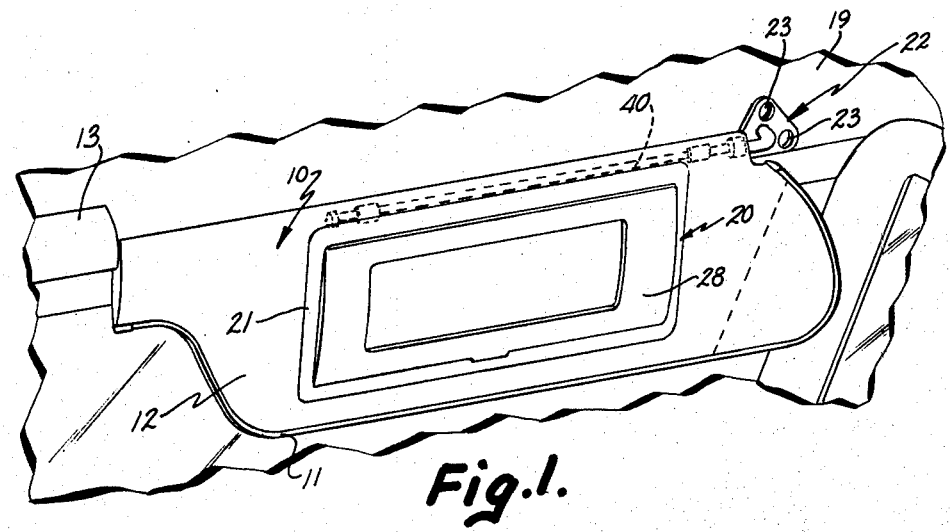
FIG. 1 is a fragmentary perspective view of a visor of the present invention with a lighted and covered visor mirror shown in its downward position.
Figure 2:
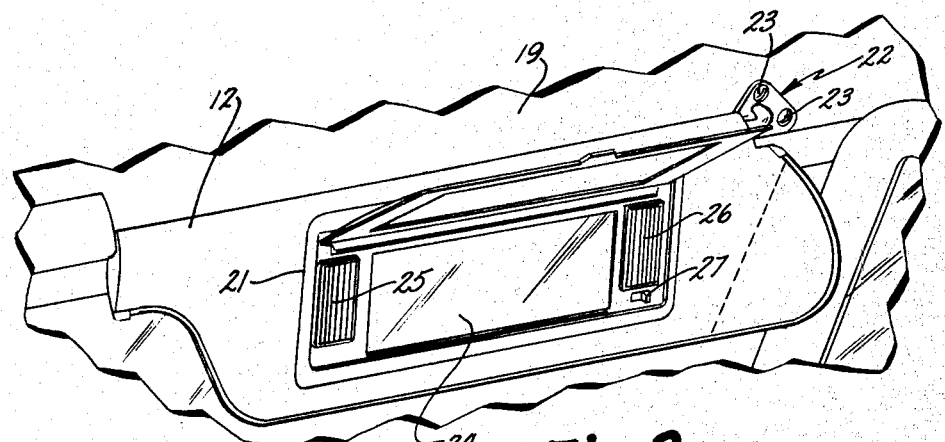
FIG. 2 is a fragmentary perspective view of the structure shown in FIG. 1 with the visor mirror cover in an open position.

Referring initially to FIGS. 1 and 2, a visor assembly 10 is disclosed incorporating the present invention and is shown in the Figures mounted on the passenger side of a vehicle. The visor assembly comprises a visor body 12 made of a core member comprising two halves 14 and 16 (FIG. 3) injection molded of a suitable polymeric material such as polypropylene joined along a hinge 15 and subsequently snap locked together by means of latches 17 and 18 (FIGS. 3 and 5) spaced at various locations along the core halves in mating opposed relationship such that during assembly, the core halves 14, 16 are locked together to form the visor body.

The visor body includes a rectangular recess (not shown) for receiving therein a visor mirror frame assembly 20. The core of the visor is covered by a suitable upholstery material or textured to conform to the upholstery of the vehicle interior and is trimmed along the edge by a suitable trim bead 11. A post extends from the left end (as viewed in FIGS. 1 and 2) of the visor to detachably couple the visor to a centrally located bracket 13 positioned in the headliner of a vehicle. The opposite end of the visor assembly includes a pivot mounting bracket 22 to which the visor support rod 40 encompassing the present invention is secured as described below.

The visor body 12 is similar to and manufactured in substantially the same manner as disclosed in U.S. Pat. No. 4,075,468, issued Feb. 21, 1978, to Konrad H. Marcus, and assigned to the present assignee, the disclosure of which is incorporated herein by reference. The visor body, however, includes significant changes described hereinafter to accommodate the unique visor support rod 40.

The visor mirror assembly 20 comprises a generally rectangular frame 21 into which there is secured a mirror 24. On the opposite sides of mirror 24 there is provided a pair of lenses 25 and 26 as seen in FIG. 2 behind which there is provided electrical lights. Power is applied from the vehicle's electrical system to the lights through switch 27 for directing illumination in a converging manner outwardly from the mirror 24. The mirror is covered by a snap open cover 28 shown in the closed position in FIG. 1 and in its open position in FIG. 2. The mirror and frame construction of assembly 20 is described more fully in copending U.S. patent application entitled COVERED VISOR MIRROR, filed on Nov. 9, 1978, Ser. No. 958,968, and now U.S. Pat. No. 4,213,169, assigned to the present assignee, the disclosure of which is incorporated herein by reference.

Having briefly described the overall visor construction, a detailed description of the unique coupling of the visor body to the improved support rod and to the vehicle for providing pivotal motion between an upward stored position and the downward in use position shown in FIGS. 1 and 2 and the motion of pivot mounting bracket 22 to change the visor from the front windshield position shown in FIGS. 1 and 2 to the side window position is now presented.

Referring next to FIGS. 7 and 8, there is shown an integral visor support rod 40 comprising a cylindrical rod having an elongated leg 41 and a shorter leg 42 formed by bending the rod at a 90° angle at junction 43. Leg 41 terminates in a tip end 44 and includes an annular recess 45 near the tip end for receiving a first torque fitting 50. Near the junction 43 there is provided a second annular recess 46 formed in the cylindrical rod 40 for receiving a second torque fitting 60. On the shortened leg section 42 there is also provided an annular recess 47 for receiving a third torque fitting 70. Rod 60 comprises a steel rod having a zinc plating to which the torque fittings 50, 60, and 70 are integrally molded.

Torque fitting 50 (FIG. 11) comprises a cylindrical collar having a tapered forward edge 52, cylindrical sidewalls 54, and a flat rear surface 56. A pair of generally rectangular flanges 58 are provided and extend outwardly from the cylindrical collar at opposite sides thereof as seen also in FIG. 6. The leading edges 59 of flanges 58 are also tapered as seen in FIG. 11 to provide ease of installation.

The second torque fitting 60 (FIG. 10) similarly comprises a cylindrical collar having a tapered front or leading edge 62, cylindrical sidewalls 64, and a flat rear surface 66. Collar 60 includes a pair of outwardly projecting flanges 68 having alternately spaced rounded projections 69 extending outwardly from opposite sides of flanges 68 as also seen in FIG. 4 for tightly securing the flanges 68 within a corresponding keyway 104 (FIG. 4) of the visor body. The leading edge of flanges 68 is tapered to provide ease of insertion into the boss 100 in which the keyway 104 is formed.

Similarly, torque fitting 70 comprises a cylindrical collar having outwardly projecting flanges 78 on opposite sides thereof as also seen in FIG. 9 and includes outwardly projecting curved semicircular projections 79 similar to projections 69 for assuring a tight fit within the keyway 32 formed in the pivot mounting bracket 22.

Each of the torque fittings 50, 60, and 70 are made from a lubricous polymeric material which can be molded to rod 40 and which shrinks upon cooling to provide a breakaway torque of approximately ½–6 foot pounds depending on the visor in which the invention is used. Thus, a lightweight visor without a lighted mirror would require a significantly smaller amount of torque for holding the visor in an adjusted position. The torque is directly related to the length of the collars which is varied to achieve the desired torque for a given polymeric material. The visor body 12 to which the torque fittings are anchored rotates the torque fittings on rod 40, and rod 40 can rotate within torque fitting 70 secured to bracket 22 for holding the visor in a desired adjusted position. It has been found that acetal and particularly acetal homopolymer such as DELRIN ® 500 DK 602 provides the desired characteristics for this application. Other polymeric materials, however, having a shrinkage of from 0.020 to 0.025 inches per linear inch to compressibly engage the cylindrical rod 40 and which upon cooling will not set up against the rod thereby providing the desired breakaway torque could also be employed. The desired properties of such material is set forth in greater detail in the *Modern Plastics Encyclopedia*, McGraw-Hill, New York, Volume 54, Number 10A, 1977–1978, on Page 8, the disclosure of which is incorporated herein by reference. In the preferred embodiment, recess 45 had a diameter of ¼ of an inch while torque fitting 50 had a length of ½ of an inch. Similarly, recess 46 had a diameter of ¼ of an inch while torque fitting 60 had a length of ¾ of an inch. Finally, recess 47 had an outer diameter of ¼ of an inch while torque fitting 70 had a length of ⅝ of an inch.

Once the torque fittings are molded on rod 40, end 42 of the visor support rod is inserted into receiving means comprising keyway 30 formed downwardly in the center of mounting bracket 22 as seen in FIGS. 7 through 9. Keyway 30 comprises a generally circular opening 32 formed in the cast metal bracket 22 and includes a pair of rectangular slots 34 on opposite sides for receiving the flanges 78 of torque fitting 70. The rod is then secured within the bracket 22 by means of a set screw 36 extending through a threaded aperture 37 formed in the cylindrical wall 38 of bracket 22 as seen in FIG. 8. Set screw 36 also is threadably secured to a threaded aperture 71 formed in one of the flanges 78 of the torque fitting 70 to prevent the rod from slipping out of the mounting bracket 22 (i.e., movement in the vertical direction as shown in FIG. 8). Other means for securing the torque fitting 70 within the mounting bracket 22 could be employed. Thus, for example, the cylindrical wall 38 of the mounting bracket could include a tab which extends into a corresponding mating slot formed in the sidewall of torque fitting 70 such that once the device is pushed into the keyway 30, it snaps into a locked position. Bracket 22 also includes a plurality of apertures 39 for securing the bracket to the vehicle headliner 19 by means of a plurality of screws 23 as shown in FIGS. 1 and 2. Once the rod 40 is mounted to the pivot mounting bracket 22, the rod is lockably mounted within receiving means of the visor body as now described in conjunction with FIGS. 3 through 6.

Figure 3:
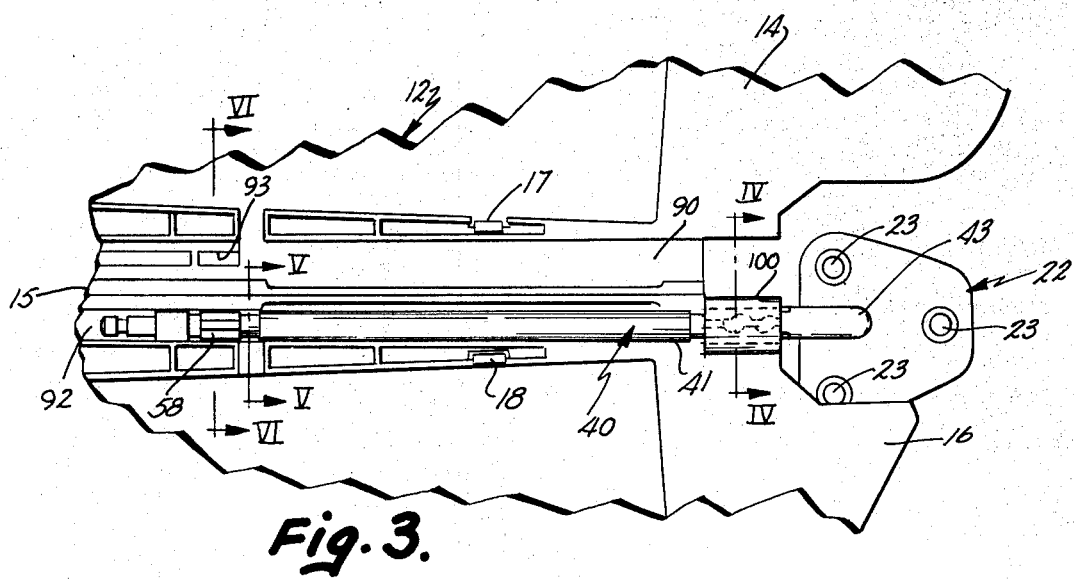
FIG. 3 is an enlarged fragmentary perspective view of the visor shown in FIGS. 1 and 2 showing the two halves of the molded visor body in an open position and the visor support rod mounted therein.

Referring initially to FIG. 3, on opposite sides of hinge 15 coupling core halves 14 and 16 of the visor body, there is provided generally semicircular elongated recesses 90 and 92, respectively, for receiving and circumscribing the cylindrical visor support rod 40 when the body halves are joined. Recesses 90 and 92 include means for anchoring torque fitting 50 comprising a first keyway defined by rectangular slots 93 and 95 in recesses 90 and 92, respectively. As seen in FIGS. 3 and 6, slots 93 and 95 snugly receive the flanges 58 of torque fitting 50.

Near the right end of the visor body as viewed in FIG. 3 there is provided means for anchoring fitting 60 within the visor body which comprises a cylindrical mounting boss 100 integrally formed on core half 16. As best seen in FIG. 4, boss 100 includes a circular aperture 102 formed therethrough with a pair of opposed rectangular slots 104 and 106 for receiving the flanges 68 and projections 69 of torque fitting 60. Boss 100 is longitudinally spaced with respect to slots 93 and 95 such that the torque fittings align with the flanges within the respective slots for securely anchoring the torque fittings to the body of the visor core against rotation when the visor core halves are closed into a locked position as shown in FIGS. 4, 5, and 6.

In order to lockably secure the rod 40 within the visor body and prevent the visor from slipping off of rod 40, locking means are provided. As best seen in FIG. 5, the locking means comprises a tab 108 formed in member 16 and projecting upwardly from recess 92 to engage the rear surface 56 of torque fitting 50 once rod 40 is fully inserted as shown in FIG. 3. For such purpose, tab 108 is made by forming a generally U-shaped slot through the wall of recess 92 leaving the cantilevered tab 108 which is formed upwardly into the position shown in FIG. 5. Once the support rod is inserted as shown in FIG. 3, the core halves 14 and 16 are snapped shut and locked by means of a plurality of mating locking tabs 17 and 18 which operate as shown in FIG. 5 to snap lock the visor body together. Naturally, before this is done, the visor mirror assembly 20 is installed together with the necessary electrical wiring.

Another embodiment of the invention employing a single torque fitting internal to the visor body is illustrated in FIG. 7, where rod 40 is shortened to terminate at dashed line 47. In this embodiment, recess 46 is elongated at the left end as is torque fitting 60 to the position indicated by dashed line 48 in FIG. 7. Boss 100 also is lengthened and reinforced with molded ribs joining the boss to member 16 to strengthen its coupling to member 16. The interface between the shortened rod 40 and the visor body 12 thus is of sufficient strength to accommodate the visor. Torque fitting 60 is thus anchored and can be locked within the visor body to operate in the same manner as in the first embodiment to provide a torque fitting within the visor body and provide a predetermined breakaway and holding torque for the visor on rod 40.

With the present invention, therefore, the relatively complicated multipiece construction of the prior art is supplanted by the integral support rod 40 and torque fitting construction which is inserted into the molded visor greatly facilitating the manufacturing of and significantly reducing cost of the unit. Further, by utilization of the torque fitting, a durable and reliable visor system is provided for rotating the visor in a vertical direction by torque fittings 50 and 60 and in a second generally horizontal plane by torque fitting 70 within pivot bracket 22. It is contemplated that the torque fittings 50 and 60, or 60 alone in the second embodiment, could be used independently of the torque fitting 70 with rod 40 being inserted into a conventional pivot mounting bracket if desired. Similarly, torque fitting 70 could be employed only for the pivot mounting bracket. The preferred embodiment, however, incorporates three such torque fittings as disclosed herein.

It will become apparent to those skilled in the art that these and various other modifications to the preferred embodiment of the invention can be made without departing from the spirit or scope thereof as defined by the appended claims.

The embodiments of the invention in which an exclusive property or privilege is claimed are defined as follows:

1. A visor comprising:
   a visor body including recess means for receiving a visor support rod, said recess means including a locking tab extending toward a visor rod;
   a visor support rod including a pair of collars made of a lubricous polymeric material molded and shrunk in spaced relationship on said rod to form a continuous cylindrical and uniformly compressive contact area between each of said collars and said rod for permitting rotation between said collars and said rod to provide a predetermined torque between said collars and said rod, said collars including flange means cooperating with said recess means of said visor body to anchor said collars within said visor body against rotation within said visor body and said tab cooperating with said collar to prevent axial movement of said rod.

2. The visor as defined in claim 1 wherein said collars are generally cylindrical and said flange means includes projection means extending laterally outwardly therefrom and wherein said recess means comprises a keyway for holding said flange means of said collars with said projection means interfitting with said keyway for securing said collars in said keyway.

3. The visor as defined in claim 2 wherein said collars are positioned near opposite ends of said support rod.

4. The visor as defined in claim 3 wherein said flange means and said collars include a taper at one end to facilitate insertion of said support rod into said receiving means of said visor body.

5. A visor comprising:
   a visor body including means for receiving a visor support rod; and
   a visor support rod including a pair of generally cylindrical collars made of a lubricous polymeric material molded and shrunk in spaced relationship positioned near opposite ends of said support rod to form a continuous cylindrical and uniformly compressive contact area between each of said collars and said rod for permitting rotation between said collars and said rod to provide a predetermined torque between said collars and said rod, said collars including flange means extending outwardly therefrom cooperating with said receiving means which includes a keyway in said visor body for holding said flange means to anchor said collars against rotation within said visor body, wherein said flange means and said collars include a taper at one end to facilitate insertion of said support rod into said receiving means of said visor body and wherein said flange means on at least one of said collars is a generally rectangular flange which includes a plurality of alternately spaced rounded projections extending from opposite sides of said flange within the associated keyway.

6. The visor as defined in claim 5 wherein said collars are molded of a material with a shrinkage upon cooling to provide a predetermined torque of from about ½–6 foot pounds.

7. The visor as defined in claim 6 wherein said visor body includes means for locking said support rod within said receiving means.

8. The visor as defined in claim 7 wherein said collars are molded of acetal.

9. The visor as defined in claim 8 wherein said acetal is DELRIN ®.

10. A visor comprising:
a visor body including recess means for receiving a visor support rod; and
a visor support rod including a collar made of a lubricous polymeric material and molded and shurnk on said rod to provide a continuous cylindrical contact area with uniform compression along the contact area between said collar and said rod for permitting rotation between said collar and said rod, said collar having a length selected to provide a predetermined torque between said collar and said rod, said collar including a flange fitted within said visor body and cooperating with said recess means of said visor body to anchor said collar within said visor body and against rotation within said visor body wherein said collar is generally cylindrical and said flange means includes projection means extending laterally outwardly therefrom and wherein said recess means comprises keyway for holding said flange means of said collar with said projections interfitting with said keyway for securing said collar in said keyway.

11. The visor as defined in claim 10 wherein said flange means and said collar include a taper at one end to facilitate insertion of said support rod into said visor body.

12. The visor as defined in claim 10 and further including means for securing one end of said rod to a vehicle.

13. The visor as defined in claim 12 wherein said securing means comprises a bend formed in said rod to form an L-shaped rod and means for attaching the leg of said rod remote from said collar to a vehicle.

14. A visor comprising:
a visor body including means for receiving a visor support rod; and
a visor support rod including a generally cylindrical collar made of a lubricous polymeric material and molded and shrunk on said rod to provide a continuous cylindrical contact area with uniform compression along the contact area between said collar and said rod for permitting rotation between said collar and said rod, said collar having a length selected to provide a predetermined torque between said collar and said rod, said collar including flange means extending outwardly therefrom and wherein said receiving means includes a keyway for holding said flange means of said collar when fitted within said visor body and cooperating with said receiving means of said visor body to anchor said collar against rotation within said visor body, wherein said flange means and said collar include a taper at one end to facilitate insertion of said support rod into said visor body, and wherein said flange means is a generally rectangular flange which includes a plurality of alternately spaced rounded projections extending from opposite sides of said flange to secure said flange within the associated keyway.

15. The visor as defined in claim 14 wherein said collar is molded of a material with a shrinkage upon cooling to provide a predetermined torque of from about ½–6 foot pounds.

16. The visor as defined in claim 15 wherein said collar is molded of acetal.

17. The visor as defined in claim 16 wherein said acetal is DELRIN ®.

18. A visor comprising:
a visor body including means for receiving a visor support rod;
a visor support rod including a collar made of a lubricous polymeric material and molded and shrunk on said rod permitting rotation between said collar and said rod to provide a predetermined torque between said collar and said rod, said collar fitted within said visor body and having flange means with laterally extending curved projections cooperating with said receiving means of said visor body to anchor said collar against rotation within said visor body, and
means for securing one end of said rod to a vehicle comprising a bend formed in said rod to form an L-shaped rod and means for attaching the leg of said rod remote from said collar to a vehicle wherein said attachment means includes a mounting bracket having a keyway formed therein extending generally at right angles to the longitudinal axis of said rod said an additional integrally formed collar and flange means made of a lubricous polymeric material molded and shrunk on said leg to provide a predetermined torque between said additional collar and said leg, said leg and collar fitted into said keyway of said bracket with said flange means cooperating with said keyway to prevent rotation between said collar and bracket.

19. The visor as defined in claim 18 wherein said visor body includes means for locking said support rod within said receiving means.

20. The visor as defined in any one of claims 10, 15, or 17 wherein said support rod includes a recess onto which said collar is molded.

21. A visor assembly for a vehicle comprising:
a visor body including a recess for receiving a visor support rod; and
a visor support rod including a pair of spaced recesses on which generally cylindrical collars made of a lubricous polymeric material are molded and shrunk to provide a continuous cylindrical and uniformly compressive contact area between each of said collars and said rod for permitting rotation between said collars and said rod to provide a predetermined torque between said collars and said rod, said collars including flange means extending outwardly therefrom and cooperating with said recess of said visor body to anchor said collars against rotation within said visor body, said visor support rod having one end extending from said visor body for securing the visor assembly to a vehicle, wherein said flange means and said collars include a taper at one end to facilitate insertion of said support rod into said visor body, and wherein said flange means on at least one of said collars is a generally rectangular flange which includes a plurality of alternately spaced rounded projections extending from opposite sides of said flange to secure said flange means within said recess of said visor body.

22. The visor as defined in claim 21 wherein said collars are molded of a material with a shrinkage upon cooling to provide a predetermined torque of from about 1-4 feet.

23. The visor as defined in claim 22 wherein said collars are molded of acetal.

24. The visor as defined in claim 23 wherein said acetal is DELRIN ®.

25. For use in a visor assembly for a vehicle which assembly includes a visor body including recess means for receiving a visor support rod, an improved visor support rod comprising:

a support rod including a collar made of a lubricous polymeric material and molded and shrunk on said rod to form a continuous cylindrical and uniformly compressive contact area between said collar and said rod for permitting rotation between said collar and said rod to provide a predetermined torque of from about ½-6 foot pounds between said collar and said rod, said collar having flange means which fit within the body of the visor said flange means including curved projections extending laterally for cooperating with said recess means of the visor body to anchor said collar within said visor body against rotation within the visor body.

26. The visor as defined in claim 25 wherein said rod includes a pair of spaced collars.

27. The visor as defined in claim 26 wherein said rod is L-shaped with said spaced collars positioned on one leg of said rod and an additional collar positioned on the other shorter leg for mounting said rod to a pivot bracket.

28. A visor assembly comprising:

a visor core integrally including means for receiving a visor support rod, said means including a pair of longitudinally spaced keyways; and a visor support rod including a pair of collars made of a lubricous polymeric material molded and shrunk in spaced relationship on said rod a distance corresponding to the spacing between said keyways, said collars forming a continuous cylindrical and uniformly compressive contact area between each of said collars and said rod for permitting rotation between said collars and said rod to provide a predetermined torque between said collars and said rod, said collars having flange means with a width less than the width of said keyways and curved projections extending laterally from said flange means for interfitting with said keyways for securing said collars in said keyways to anchor said collars against rotation within said visor body.

29. The apparatus as defined in claim 28 wherein said visor core is molded in two halves hinged to each other along a common junction and wherein said keyways are positioned adjacent said junction.

30. The apparatus as defined in claim 29 wherein said keyways are partially formed in each core half and wherein said core further includes locking tabs securely holding said core halves together with said receiving means circumscribing said collars.

31. A visor assembly comprising:

a visor body molded in two hinged halves and including means for receiving a visor support rod which means includes a keyway; and a visor support rod including a collar made of a lubricous polymeric material and molded and shrunk on said rod permitting rotation between said collar and said rod said collar having a length to provide a predetermined torque between said collar and said rod, said collar including a flange with spaced projections extending outwardly from sides of said flange to engage sides of said keyway when said rod is fitted within said visor body to anchor said collar against rotation within said visor body.

* * * * *

UNITED STATES PATENT AND TRADEMARK OFFICE
CERTIFICATE OF CORRECTION

PATENT NO. : 4,352,518

DATED : October 5, 1982

INVENTOR(S) : Edgar D. Prince; Konrad H. Marcus

It is certified that error appears in the above-identified patent and that said Letters Patent is hereby corrected as shown below:

Column 7, Claim 5, line 5, after "flange" insert
-- to secure said flange --.

Signed and Sealed this

First Day of March 1983

[SEAL]

Attest:

GERALD J. MOSSINGHOFF

Attesting Officer       Commissioner of Patents and Trademarks